United States Patent
Rhee et al.

(10) Patent No.: US 10,956,927 B2
(45) Date of Patent: Mar. 23, 2021

(54) CARD-LINKED MERCHANT PROMOTIONAL CREDIT PROCESSING

(71) Applicants: Peter Rhee, San Mateo, CA (US); Edmar Soriano, Newark, CA (US); Alexander Campbell, Daly City, CA (US)

(72) Inventors: Peter Rhee, San Mateo, CA (US); Edmar Soriano, Newark, CA (US); Alexander Campbell, Daly City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 306 days.

(21) Appl. No.: 15/853,392

(22) Filed: Dec. 22, 2017

(65) Prior Publication Data

US 2019/0197577 A1  Jun. 27, 2019

(51) Int. Cl.
*G06Q 30/02* (2012.01)
*G06Q 20/02* (2012.01)
*G06Q 20/34* (2012.01)
*G06Q 20/20* (2012.01)

(52) U.S. Cl.
CPC ....... *G06Q 30/0238* (2013.01); *G06Q 20/023* (2013.01); *G06Q 20/346* (2013.01); *G06Q 20/3433* (2013.01); *G06Q 20/204* (2013.01)

(58) Field of Classification Search
None
See application file for complete search history.

(56) References Cited

U.S. PATENT DOCUMENTS

| | | | |
|---|---|---|---|
| 8,285,643 B2 | 10/2012 | Isaacson et al. | |
| 8,473,334 B2 | 6/2013 | Gibbs | |
| 8,566,197 B2 | 10/2013 | Satyavolu | |
| 8,676,704 B2 | 3/2014 | Ledbetter et al. | |
| 9,558,505 B2 | 1/2017 | Wolf | |
| 9,781,594 B2 | 10/2017 | Hailpern | |
| 2010/0312629 A1* | 12/2010 | Wolf | G06Q 20/28 705/14.27 |
| 2013/0024260 A1* | 1/2013 | Peterson | G06Q 30/0208 705/14.23 |
| 2013/0151323 A1* | 6/2013 | Shepard | G06Q 30/0222 705/14.23 |
| 2014/0257952 A1* | 9/2014 | Burns | G06Q 30/0212 705/14.14 |
| 2014/0330713 A1 | 11/2014 | Isaacson et al. | |
| 2016/0337844 A1* | 11/2016 | Hailpern | H04W 8/183 |

OTHER PUBLICATIONS

Crowe et al., "U.S. Mobile Payments Landscape—Two Years Later", Federal Reserve Bank of Boston and Federal Reserve Bank of Atlanta, May 2, 2013. (Year: 2013).*

* cited by examiner

*Primary Examiner* — Christopher B Tokarczyk
(74) *Attorney, Agent, or Firm* — Loeb & Loeb, LLP

(57) ABSTRACT

A system of servers and algorithms allows merchants to award value to a customer when certain criteria have been met, such as buy $100 worth of clothing and get a $20 credit toward a future purchase. Unlike a gift card, the funding for the award is held by the merchant until the award is used, at which time the award funds are transferred to the user's designated account, such as an open loop credit or debit card.

18 Claims, 6 Drawing Sheets

US 10,956,927 B2

1

CARD-LINKED MERCHANT PROMOTIONAL CREDIT PROCESSING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As competition for customer's share of mind and spending increases, merchants may attempt to attract and retain customers by offering discounts on products. In some cases, a merchant may award value via a gift card to a customer for some past behavior, such as reaching a level of purchases with the merchant. However, recipients/customers may often lose or forget to use gift cards which can cause them to become frustrated. Gift cards may also raise escheatment issues when funds are held by third parties on behalf of a customer.

Further, gift cards and gift codes are subject to high fraud rates resulting from, among other methods, card bots sweeping through active card numbers, three-way call balance checks, package tampering, and card switching.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a system of specially programmed servers and algorithms may allow a merchant to make a more sophisticated offer than a simply discount on a specified purchase. The merchant may develop a campaign that uses the servers and algorithms to monitor a customer's purchases to determine when one or more qualifying purchases have been made. After qualifying for the award, a server may store a record of the award and any rules for redemption of the award, such as a time period, merchant or brand, or particularly product or product category. When the customer makes the subsequent purchase or purchases, the award value may be automatically applied to the purchase. In this way, the award amount is automatically available to the customer whenever a future purchase is made that meets the redemption criteria. Because the award value is actually held by the merchant, escheatment complications may be reduced because no third parties hold the funds on behalf of the customer.

Further, the system may allow the merchant to have multiple meaningful contacts with the customer. For example, the merchant may inform the customer of the campaign and invite participation or even a pre-registration. As the customer completes various qualifying activities and again when the qualifications have been met, the merchant may continue to inform the customer of progress and the final goal. When the award value is subsequently redeemed, the merchant may have a final opportunity to contact the customer related to the single campaign.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
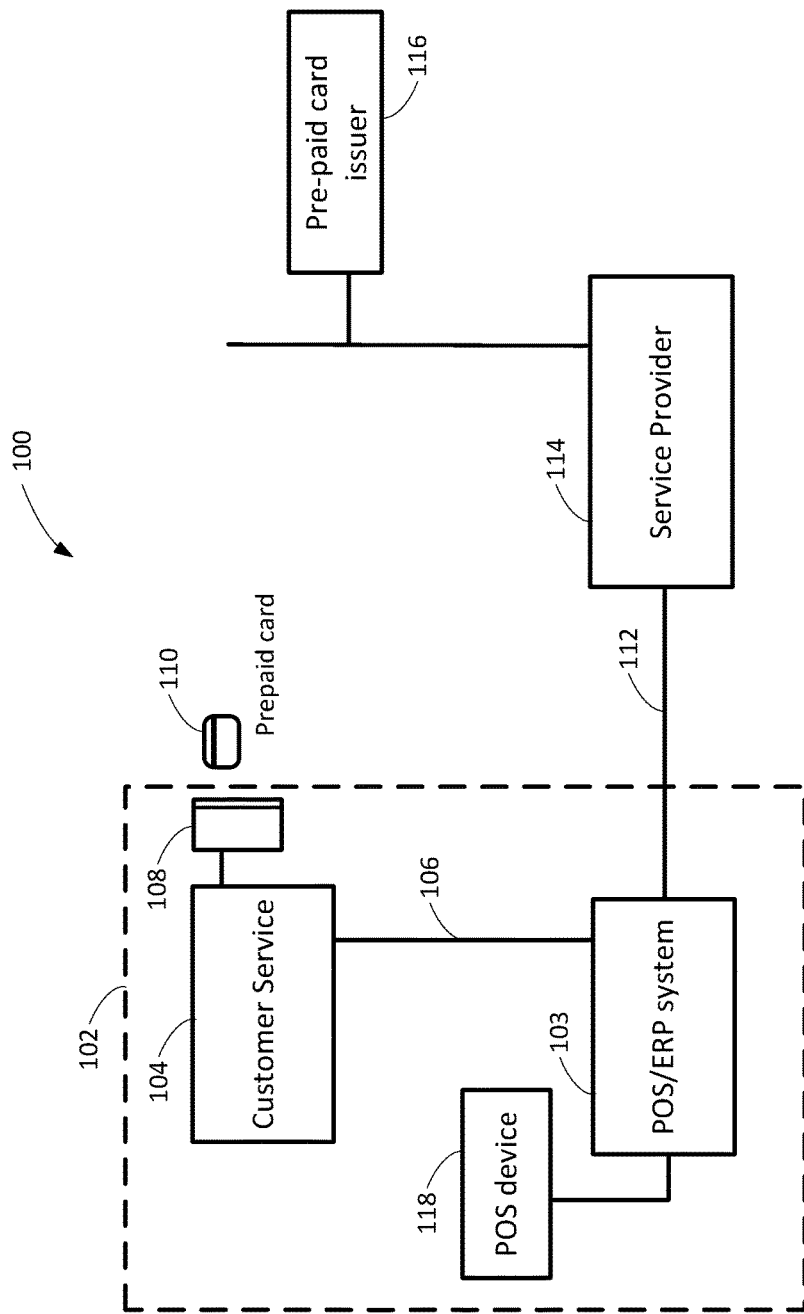
FIG. 1 illustrates a block diagram of prior art system elements for providing a store credit

FIG. 1 is an illustration of a prior art system 100 that is used to provide a store credit to a customer using a merchant system 102. The store credit may be the result of a buy some/get some offer. For example, the merchant may offer a $10 store credit after spending $50 in a calendar month. Another example, may be an offer to buy two, get the third item free. Other examples abound, but they are linked by the theme of a first qualifying purchase or set of purchases that qualifies the customer for a credit usable for a future purchase, often in the form of a gift card. The merchant system 102 may include a point of sale (POS) system 103 coupled to a customer service terminal 104 by a network connection 106. The POS system 103 may include or be coupled to enterprise resource planning (ERP) functions such as inventory control, payroll, sales tracking, etc. In this illustration, the POS system 103 is be coupled to one or more POS devices 118 that are used to perform checkout functions for retail, in-person, sales. The customer service terminal 104 may be used to create a gift card for future use toward another purchase after a first qualifying purchase is made. Alternatively, the gift card may be generated and sent to the customer after examining the customer's purchase history to identify a qualifying purchase or set of purchases.

In this scenario, a swipe device 108 may be used to activate a prepaid card 110 (i.e. a closed loop card) via service provider 114 at a pre-paid card issuer 116. The service provider 114 may be an acquirer or a processor that receives transaction information, provides clearing and settlement services, or other transaction-related services. The prepaid card issuer 116 may receive the value of the credit amount from the merchant and hold the value of the prepaid card 110. When the user swipes the prepaid card, the prepaid card issuer 116 approves the transaction and delivers the funds back to the merchant during a settlement process. In the case where the prepaid card funds do not cover the cost of the transaction, the customer may have to provide a second card or cash to cover the remaining balance. There may be restrictions on the prepaid card 110, such as it only works at the merchant who issued it.

The merchant system 102 may be connected to the service provider 114 via a private network 112 or a virtual private network offering a high security connection for privacy and tamper-resistance. The same or a similar network 112 may connect the service provider 114 to the issuer 116.

Also as discussed above, the system 100 may require that the customer retain and remember to use the prepaid card 110 when making a qualifying purchase with the merchant or an affiliate. The customer may be required to use the prepaid card 110 in a timely manner before any service fees are accumulated that reduce or eliminate the value assigned to the card. Because the prepaid card 110 is anonymous, should the prepaid card 110 be lost or stolen, its associated value may also be lost, at least to the person to whom it was issued, but perhaps not to a person who subsequently uses the prepaid card 110. This situation represents a double liability to the merchant—the original customer may be upset that the value was lost and in some regard blame the merchant, while the merchant or issuer 116 is still liable for the remaining value on the lost card.

Figure 2:
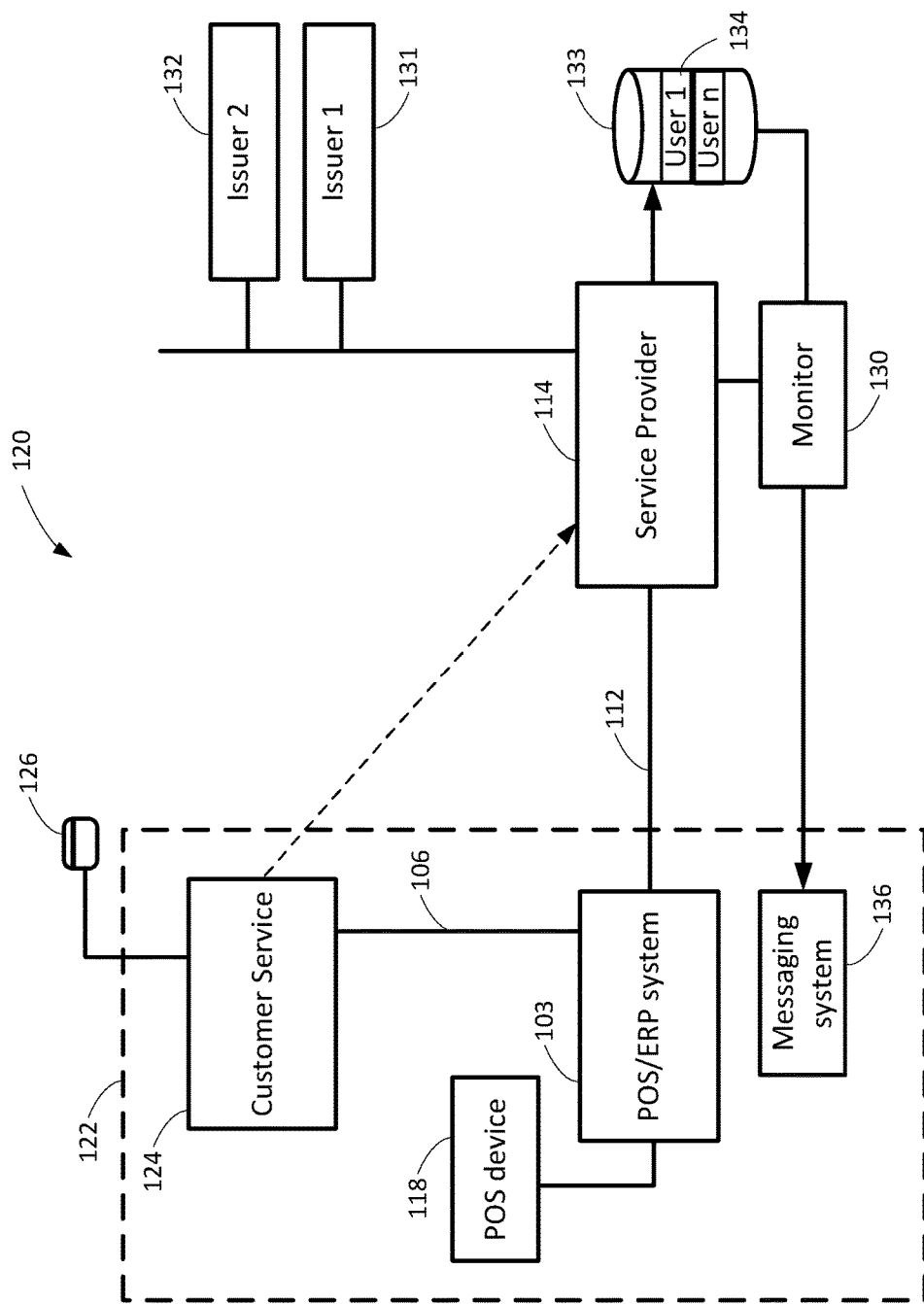
FIG. 2 is a block diagram illustrating a store credit system in accordance with the current disclosure.

FIG. 2 is a block diagram that may represent a system 120 that supports buy-something, get-something campaigns linked to a customer's financial instrument. Additional elements of the system 120 described below may provide for both the merchant-specified use of awarded value and an automatic application of funds whenever the user performs a qualifying transaction with the merchant or an authorized affiliate. Further, the system 120 may increase protection of merchants from fraudulent attempts to gain access to award value and protects customers from the risk of lost access to awards, especially compared to a prior technique of providing awards through prepaid cards. Also in contrast to providing stored value cards as the reward, the merchant actually retains the funds, i.e. credit, associated with the award until the customer actually redeems the value. Instead of transferring value, the award is associated, e.g., at a database, with the customer's open loop card personal account number (PAN). Only when the award is redeemed is the value actually moved from the merchant to a settlement entity, such as the issuer of the open loop card. In such an embodiment, fraudulent attempts to redirect award value would either have to associate the value with a real PAN and risk being identified or associate the value with a stolen card and risk having the value lost when the PAN is canceled. In either case, fraud may be minimized. On the other hand, a legitimate value holder does not lose the value if his or her card is lost, because unlike a prepaid card, the value is not associated with the card, but rather with the account.

The system 120 may include a merchant system 122 that is explained further below. The system 120 may also include the service provider 114 which may be an acquirer or a processor that receives transaction information, provides clearing and settlement services, or other transaction-related services. A monitor 130 may screen transactions being processed by the service provider 114. The monitor 130 may be coupled to a database 133 that may store award value information 134 for one or more users as well as data related to conditions for using the award value. In various embodiments, the monitor 130, database 133, or both may be part of the service provider's domain. In other embodiments, these elements may be independently operated. One or more issuers 131, 132 may issue, among other financial instruments, open loop cards for credit and debit services as are normally provided to its card holders. In the described embodiment, the issuers 131, 132 may not be a party to the application of merchant award value to a transaction other than the ultimate settlement of a transaction using the award value.

The merchant system 122 may include a point of sale (POS) device 118 and a POS system 103. In an embodiment, these two elements of the merchant system 122 may be the same those used in a prior art system in order to increase backwards compatibility and reduce installation costs.

A customer service terminal 124 may be capable of providing prior art prepaid cards 110 to make an award but may also be modified as described more below to allow a customer to provide a physical card 126 or card personal account number (PAN) using a card swipe, tap, or, dip or manual entry of a PAN or other financial instrument identifier with which to associate the award. The customer service terminal 124 may also include custom software and/or hardware that allows use of new transaction classes tailored to granting awards. This process may create in essence a direct message to the service provider 114 that allows the service provider to create a ledger-type entry of a credit amount to be associated with cardholder PAN and the merchant. In such an embodiment, the customer may be at a POS device 118 when the qualifying purchase is made and the award is granted, at which time the customer may be given the opportunity to select a card with which to associated the award, if not the card used to make the current purchase. In another embodiment, the entire award process may be handled offline so that recognition of qualifying transactions may be handled by monitor 130. In such an embodiment, the award value may be associated with a PAN that was preregistered, used in the qualifying transaction, or identified post-transaction.

The card 126 may be an existing card of the customer's, for example, an open-loop credit or debit card or similar financial instrument offered through one of the issuers 131, 132. The card may be a physical object such as a plastic card that resembles a traditional credit card or may be a virtual card that is an electronic representation on a computing device that is capable of interfacing with the various networks in the system 120.

In operation, a merchant may offer an award credit to a customer. The award may be related to the customer successfully fulfilling the requirements for the award, such as purchasing a specific product or making purchases above a specified value over a given period of time. In a more manual embodiment, a customer service terminal 124 may enter the amount of award credit to be provided to the customer. In this embodiment, the process may involve use of a custom transaction code supported by the service provider 114. After the award amount has been entered, the customer may indicate an open loop credit or debit card with which the credit may be associated. In one embodiment, the customer may be given a code or website that can be used by the customer to enter the open loop card at a later time. In another embodiment, the customer may have provided the open loop card PAN during a registration process. The merchant may further specify during the award credit transaction which merchant, e.g., brand or brands, for which the award is to be available. In an embodiment, special programming of the customer service terminal 124 may allow different brands to be specified for a particular credit amount. For example, an award for one campaign may be limited to the branded store where the qualifying purchase was made while another award may be made that is open to a family of associated brands. In another embodiment, the award may only be available for a purchase of the same item as the qualifying purchase. All the stipulations for the qualification for and redemption of the award may be developed as part of the campaign and stored as rules that are evaluated and enforced by the monitor 130.

The customer service terminal 124, in an embodiment, via the POS system 103, may then submit the award credit transaction to the service provider 114. The service provider 114, or monitor 130, may accept the award credit transaction and store the credit amount, the merchant (brand), PAN and any other restrictions or information, such as a cell phone number of the customer, in the database 133. It may be noted that actual funds may not be transferred at this time, only the data associated with the award credit. Only as a subsequent qualifying transaction or transactions are completed and the award credit is applied, for example, via a statement credit, are the funds transferred from the merchant during settlement.

In another embodiment, the qualification for the award may be determined and granted automatically by the monitor 130 in conjunction with the service provider 114. For accounting purposes, an award credit transaction may be generated and processed to create an award value record associated with the customer's PAN. Similarly, the merchant 122 may receive a copy of the award credit transaction so that the liability may be recorded in, for example, the ERP system 103.

After this initial data entry, the monitor 130, as discussed more below, may review authorization and settlement streams for a transaction that matches the terms of the award. For example, the database can be searched for components of the transaction including the required merchant, the required PAN, and value in the customer's award account 134. When a refund account is identified that matches these criteria for the given transaction, the monitor 130 may mark the transaction and post a credit to the customer's open loop card with the matching PAN, while reducing the value in the award amount by the amount of the purchase, up to the value in the account. In an embodiment, this credit may be made in real time during the processing of the transaction so that the credit is realized at the POS device 118 during the purchase. In another embodiment, the credit may be made in the form of a statement credit as part of the customer's normal card billing/statement cycle.

The monitor 130 may also be connected to a messaging system 136. The messaging system as illustrated in FIG. 2 may be part of the merchant system 122 but in other embodiments the messaging system 136 may be operated by the service provider 114 or an outside service (not depicted). In an embodiment, data provided by or known about the customer may include contact information such as an email address, a mobile phone number, social media account, etc. In such a case, the monitor 130 may communicate a signal to the messaging system 136 which in turn may notify the customer that a current or recent purchase will have award credit applied to the transaction. In this way, the merchant may be able to reinforce the brand message each time an award credit is applied to a purchase.

To utilize the award credit, the customer may not be required to do anything other than use the open-loop card with which the credit was associated to make a qualifying purchase. Because no actual value may be transferred until settlement, the issuer 131 may not be aware of the application of the credit value to the purchase until the transaction is cleared prior to the customer statement being prepared. That is, the application of the award credit may not involve pre-purchase transfer of value either from the merchant to the service provider 114 or the issuer 131, unlike prior art prepaid card solutions.

Figure 3:
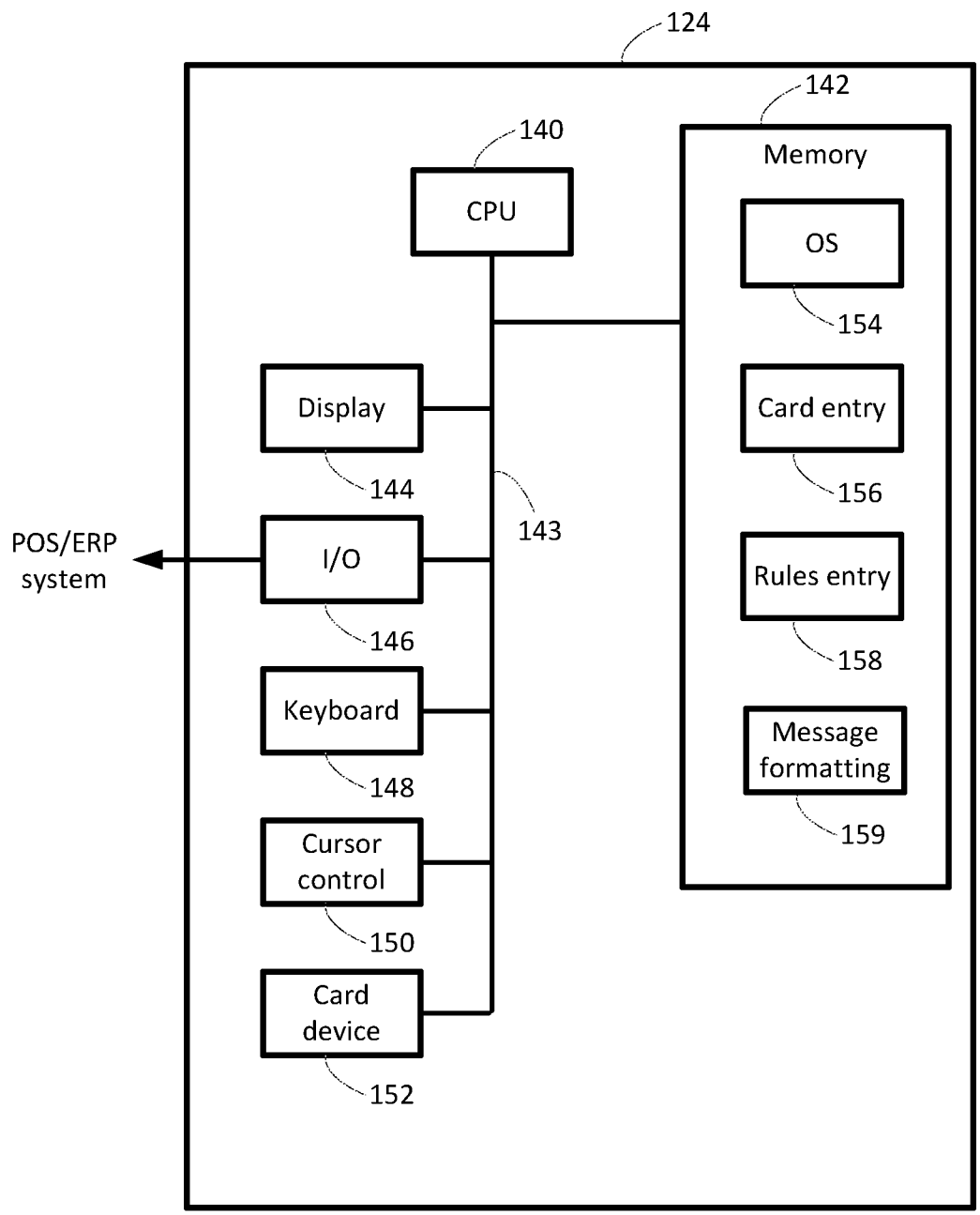
FIG. 3 is a block diagram illustrating a customer service terminal in accordance with the current disclosure.

FIG. 3 is a block diagram of one embodiment of the customer service terminal 124 illustrating one embodiment suitable for use in the system 120. A central processing unit (CPU) 140 may execute instructions stored in a memory 142. The CPU 140 and memory, as well as other peripheral devices may be connected via a data bus 143. The customer service terminal 124 may have peripheral devices including a display 144, an input/output (I/O) unit 146, a keyboard or other user interface input element such as a cursor control device 150 such as a touchpad or mouse, and, in an embodiment, a card device 152. The display 144 may present data to a user such as a customer service person and/or a customer. The display 144 may include a touchscreen so that persons interacting with the customer service terminal 124 may be able to input data via the touchscreen or a different peripheral. In an embodiment, the display 144 may mounted on a swivel so that the display 144 may be rotated for viewing by and/or interaction with a customer.

The I/O unit 146 may be a network interface card or a section of a processor that supports communication between the terminal 124 and external systems, in particular the POS system 103. The I/O unit 146 may be or include a network interface card supporting IEEE 802.x communication protocols, such as 802.3 for wired Ethernet communication and 802.11 for wireless (WiFi) communication. The keyboard 148 may provide for manual data entry of text, for example, entry of customer data, capture of return information, or manual entry of PAN data for the customer's open loop card.

The cursor control device 150 may be a mouse or touchpad that allows the operator (customer service person or customer) to move a data entry point on the display 144. A card device 152 may allow a customer to dip, tap, or swipe his or her card in order to associate that card's PAN with the refund transaction.

The memory 142 may contain executable code in several categories. In one category may be code modules, such as an operating system 154, that provide generic functionality to the customer service terminal 124. The operating system 154 may support communication functions between internal and external peripheral and devices, may support memory management, and may support basic input/output functions such as the ability to display text and graphics and receive user input. Other code modules may support custom functions that differentiate the customer service terminal 142 from a generic computer. Such code modules may include a card entry module 156, a rules capture module 158, and message formatting 159.

The card entry module 156 may support interactions with the card device 152, for example, supporting collection of PAN and/or token information from a customer's open loop card 126. The card entry module 156 may accept more than simply a PAN, such as from reading a magnetic strip. For example, when the card 126 is a chip card, the card 126 may generate a cryptogram associated with the credit return function that card entry module 156 may capture for use by in an authorization message to the service provider 114.

As discussed more below, rules or algorithms may be used to define the qualifications for both receiving and redeeming award value. As opposed to prior art systems that are limited in what qualifications can be specified, the use of the service provider 114 and monitor 130 for scanning all customer transactions allows the rules to be as complex as desired. These rules may include what merchant or store brands may be used for qualifying purchases, purchase limits, day-of-week or time-of-day limits, etc., The rules entry module 158 may be used to guide a customer service representative through entry of the refund and generation of corresponding rules, such as those just mentioned.

A message formatting module 159 may ensure that an award message that will ultimately be processed by the service provider 114 has all required data and that the data is correctly formatted. For example, when using a tokenized PAN, a cryptogram may be required to be included in the message, where a PAN taken from a magnetic strip may not have a cryptogram. The message formatting module 159 may identify the specific type (or sub-type) of stored credit message and apply the appropriate syntax rules for constructing the appropriate message.

The customer service terminal 124 may provide an experience not found in a prior art terminal 104. The terminal 124 may support additional features and functions such as a new award credit transaction that may involve both entry of a PAN as well as entry of rules governing qualification for and use of the award credit.

Figure 4:
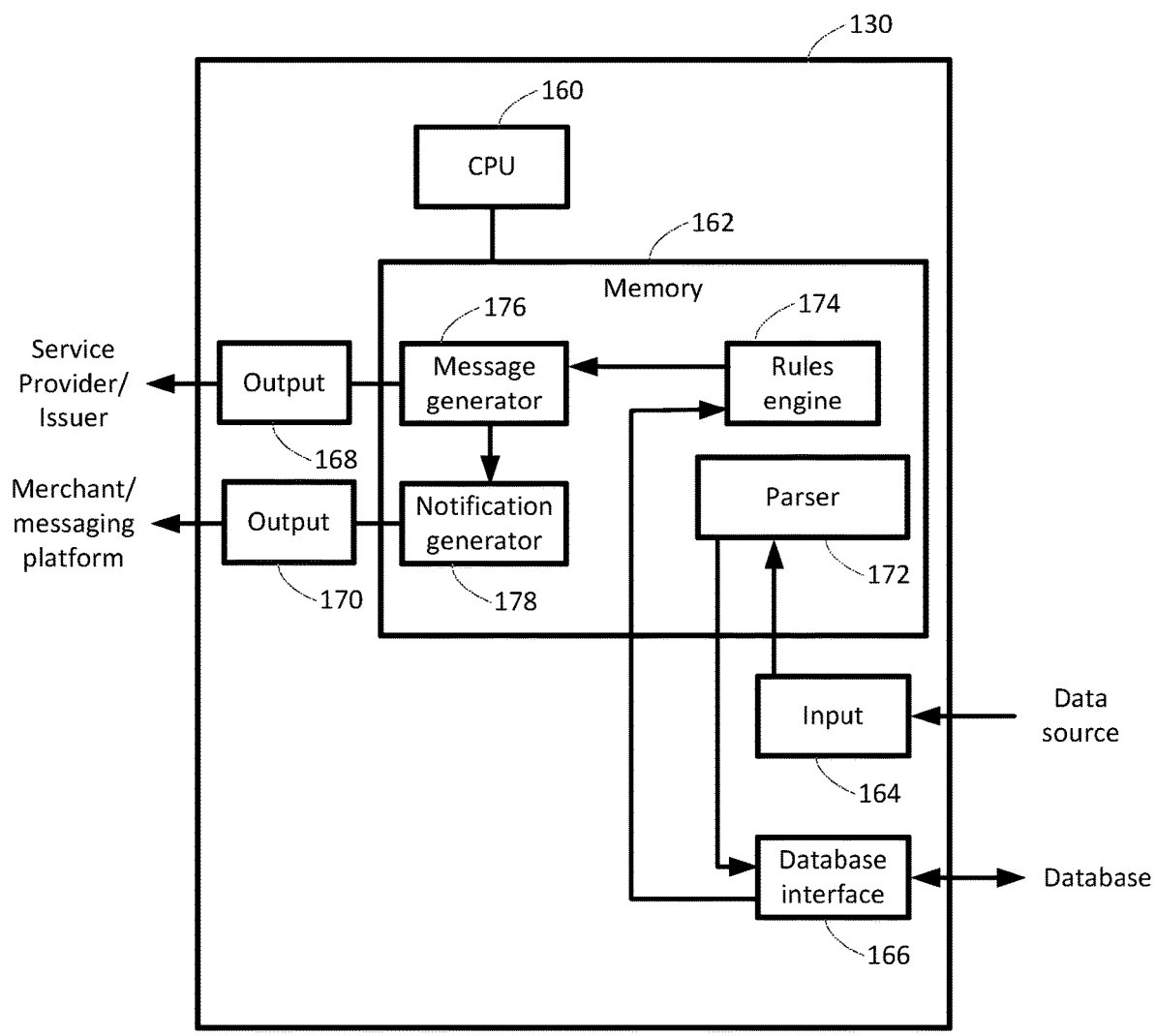
FIG. 4 is a block diagram illustrating a monitor in accordance with the current disclosure.

FIG. 4 is a block diagram of one embodiment of the monitor 130. The monitor 130 may include a central processing unit (CPU) 160 that executes code store in a memory 162. The monitor 130 may also include an input 164 coupled to a data source that provides transaction settlement and clearing messages. One such data source may be the service provider 114. The input 164 may include hardware and firmware that signal level interfaces, handshaking, message protocol, error management, etc. In an embodiment, the input may be an IEEE 802.x network interface card, such as those available from Intel Corporate or similar products. In an embodiment, the parser 172 may receive a stream of settlement and clearing messages and process those messages into data elements including, but not limited to a transaction identifier, customer PAN, merchant identifier, and transaction value. This data extraction and formatting process may also involve excluding various transaction types that may not be relevant to the target transaction, such as ATM withdrawals, etc. Additional transactions may be screened at a high level. For example, the parser 172 may exclude transactions from countries where such a process may be prohibited.

The results from the parser 172 may be provided to a database interface 166 that may formulate queries to the database 133 and receive search results. The queries related to an initial qualifying purchase may simply match a transaction to qualifying criteria, such as date, value, and/or product. A subsequent transaction may look for a dataset that match a union of merchant ID and customer PAN with available award value. When a single match is found, the results may be passed to a rules engine 174. The database interface 166 may also handle both expected responses and error conditions, such as no match and multiple matches, respectively. In the latter case, some error resolution process may be entered or the transaction may be flagged for later follow up.

The rules engine may further qualify the transaction, e.g., confirming that the transaction is within a prescribed date range. The rules engine 174 may also calculate the discount to the transaction, taking into account the effect of local taxes or other discounts already applied. The rules engine 174 may also calculate the reduction in stored award credit for the PAN and generate the database transaction for use by the database interface 166 to make the update. In general, the full amount of stored credit may be applied to a transaction up to the amount of the purchase. If the transaction value is less than the full amount of stored credit, the amount of the transaction may be deducted from the stored value amount and the database updated with the remaining value. In some cases, special rules may be enforced such as the reduction is valid on a single purchase only so that if the transaction value is less than stored value amount, the remaining stored value may simply be discarded. Other rules may include day-of-the-week restrictions that, for example, a restaurant may impose.

A message generator 176 may receive transaction data from the rules engine 174 for use in generating transaction messages that actually cause the credit to be applied to the transaction, either as an instant discount or as a settlement message. These messages may be queued and sent via an output 168 that manages the message protocol including confirmations and errors. The message generator 176 may also communicate with a notification generator 178 responsive to successful application of a credit to a transaction. The notification generator 178 may format one or more messages that ultimately are sent to the customer. The messages may include email, text messages, social media posts or combinations of these and others. The output 170 may handle protocols and other message management-related tasks.

In an embodiment, for larger or more media-savvy companies the message may be sent to the messaging system 136 of the merchant platform 122 so that the merchant can manage the delivery and branding of the information about use of the stored value. For other perhaps smaller or less sophisticated merchants, in another embodiment, the notification generator 178 may directly communicate an award credit discount message to the customer via one of more of the message channels. In such an embodiment, the notification generator 178 may publish an application programming interface (API) or allow other access that enables the merchant to manage the branding of the message without carrying the overhead of a separate messaging system 136.

The notification generator 178 may prepare customer notifications indicating when award value is associated with an open loop card as well as when that value is applied to a transaction. In an embodiment, the customer may be able to communicate a message to the notification generator 178 which triggers a response with the remaining balance of the award credit associated with one or all merchants. For example, the customer may simply text "balance" to the notification generator 178 to receive the remaining value for all merchants with outstanding balances. In another embodiment, the customer may text or otherwise message either the merchant's messaging system 136 or communicate a text with "merchant_name" to the notification generator 178 to receive in response a balance for that specific merchant. Logically, the notification generator 178 may also operate according to a published API for efficient and reliable results.

Figure 5:
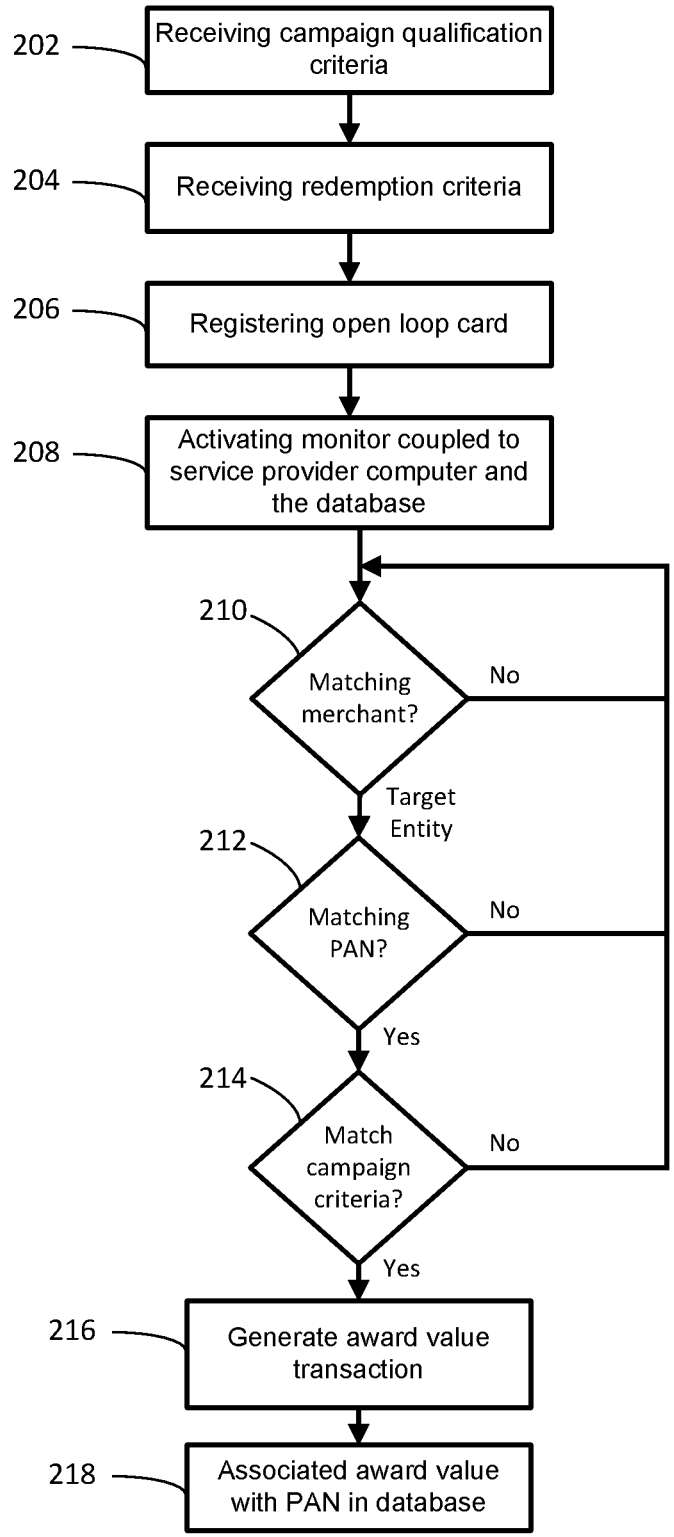
FIG. 5 is a flowchart of a method of monitoring for qualifying for transactions for an award value.

FIG. 5 is a flow chart of an exemplary method 200 of associating value with a customer account responsive to the customer satisfying a qualification criteria. At block 202202, criteria for qualifying for value associated with a campaign may be received at a service provider 114 or a monitor 130, or an equivalent entity capable of identifying qualifying transactions. The criteria may be in the form of rules, such as purchases totaling $500 between September 1 and October 15. In an embodiment, a user interface may allow description of the campaign via input boxes on an input screen, of for example, a customer service terminal 124. In an embodiment, the user interface may allow highly granular details for the campaign, including, but not limited to combinations of, a date range, a qualifying number of purchases, one or more qualifying stocking kit units (SKUs), geographic area, store brand or brands at which the transactions must occur, or target customer demographics (such as current preferred customer) and an award value. These criteria may be stored in the database 133 for use in identifying qualifying transactions either by post-processing or in real time.

At block 204, criteria for redemption of the award value may also be received, either at the same time as the qualification criteria or at a separate time. The redemption criteria may include, but are not limited to one or more of, a date range, one or more SKUs, a purchase value, a geographic area, or a store brand or brands at which the redemption purchase must be made. As above, the redemption criteria or rules may be stored at the database 133.

At block 206, an open loop card may be registered with which to associate award value. The registration may occur at many different times in the award cycle.

For example, a card may be registered before any purchases are made by the customer, or even before a campaign is launched. In such a case, the customer may have already given a blanket authorization to use a particular card for both qualification and redemption. In other embodiments, the customer may register a card in response to an invitation to participate in a campaign. In yet another embodiment, the customer may use one card to make qualifying purchases but may select another card with which to associate award value when redeeming the award.

When at least the campaign qualification criteria from block 202 have been recorded and when any date restrictions are met, at block 208 the monitor 130 may be activated to begin screening for a qualifying transaction or transactions. An exemplary screening process may be described using blocks 210-214. At block 210, a transaction may be matched to a merchant sponsoring the current campaign. If there is a match, the process may continue at block 212 to determine if the transaction is attributed to a PAN that is registered for the campaign. If so, at block 214, a determination may be made if the transaction matches one or more criteria of the campaign such as meeting a minimum value or including a particular SKU.

For campaigns that require multiple purchases, this process may simply be a first time through the loop toward compiling the required transactions. Should any of steps 210, 212, or 214 fail to provide the necessary match, the "no" branch from each may be followed and another transaction may be evaluated. Should the requirements of the campaign be satisfied, the 'yes' branch from block 216 may be followed to block 216 and an award value transaction may be generated.

The award transaction may cause, at block 218, the award value to be associated with an identified PAN. As discussed above, the PAN used for the award may be different from the PAN used in qualifying for the award, but in many cases, they will be the same. For example, a frequent flyer may qualify for an award based on ticket purchases with one PAN but may wish to allow child to redeem the value using another PAN. Steps associated with redemption of the award may be described with respect to FIG. 6.

Figure 6:
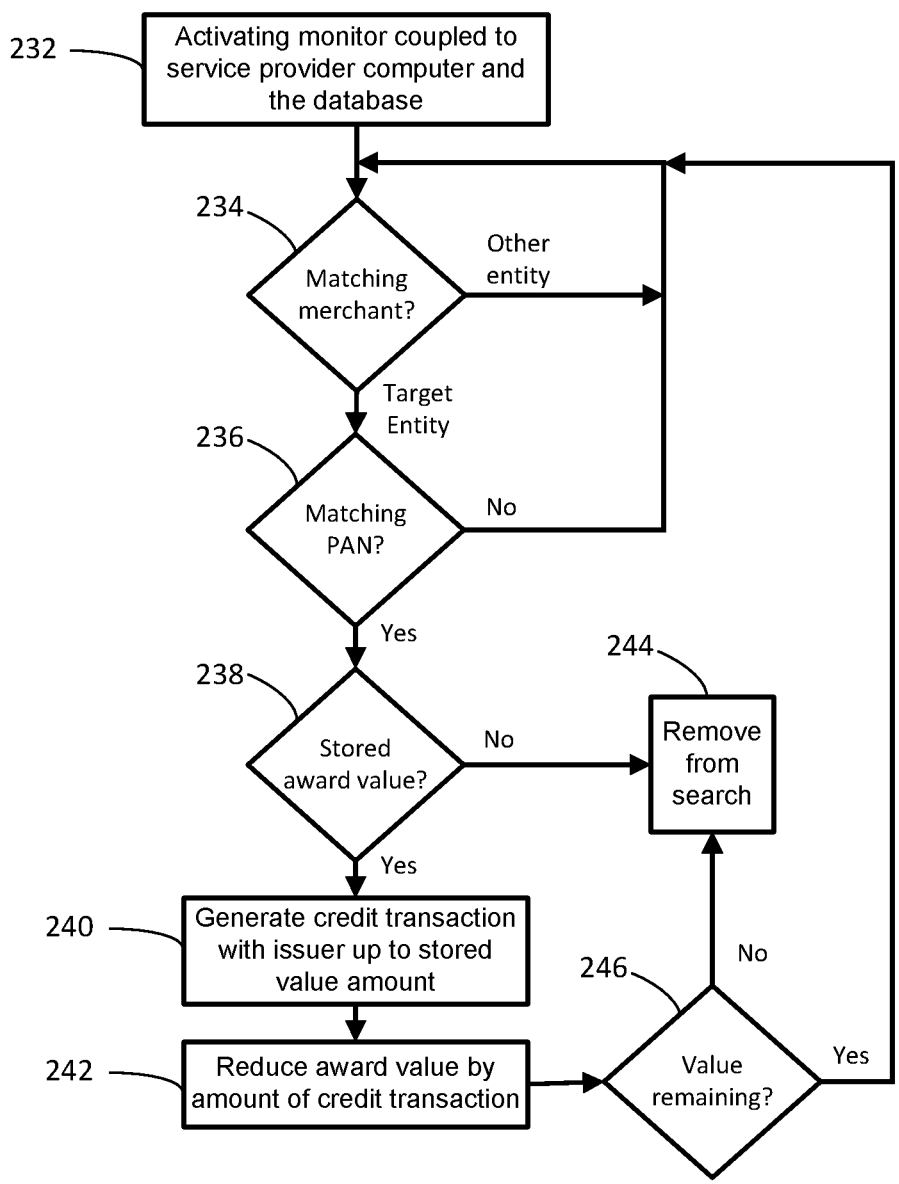
FIG. 6 is a flowchart of a method of monitoring for transactions for redemption of an award credit in accordance with the current disclosure.

FIG. 6 is a flow chart of an exemplary method 230 of redeeming award value based on a transaction subsequent to the qualifying for the award discussed above. The monitor 130 may be activated, or continue its operation, at block 232. The monitor may continue screening transactions as above but with a different set of rules for determining a qualifying transaction, with the ultimate result being the application of award credit to a transaction rather than generating an award credit.

At block 234, transactions being processed by the service provider 114 may be reviewed and analyzed for content, in this case, for merchants for whom award credit has been instantiated. That is, any transaction involving a merchant that is holding award credit may cause the process to continue to block 236, while a merchant that does not hold award credit may cause the process to loop back to review another transaction. At block 236, a check may be made to determine that the PAN associated with the transaction matches a PAN for which award credit is available. If so processing may continue at block 238, if not, processing may return to block 234. Any additional filters for application of the award credit may be applied, such as, but not limited to, specific merchant brand, items purchased (e.g., not all items may be eligible for application of award credit), time of day or day of week. As may be apparent, the order of steps 234 and 236 may be changed or the screening process may be implemented in one block so that only one test is made.

A determination of award value may be made at block 238. At this point a check for positive value may be made including commitments on current funds not yet settled. When value exists, processing may continue at block 240. In some embodiments, the remaining value may also be communicated. When no value exists, at block 244, the account may be removed from the search space so that the PAN is no longer screened for that merchant. In addition, in some embodiments, a notification of no balance may be communicated to the merchant, the customer, or both.

At block 240, after determining that the current transaction qualifies for the award and that there is still value associated with the award, the monitor 130 may generate a credit for the PAN up to the value of either the transaction or the award credit remaining for that PAN. If an amount of award credit exceeds the value of the transaction, the award credit value may be reduced by the amount credited in the transaction. If value remains at block 246, processing continues at block 234. If no store credit remains, execution continues at block 244 and the PAN is removed from the search space as discussed above.

A technical effect may be the addition of the monitor 130 to the prior art payment processing system, including the parser 172, rules engine 174 and notification generator 178. These capabilities may expand the functionality of the prior art system with features and functions supporting the application and use of store credit linked to an open loop card. Another technical effect may be the physical and programmatic changes to a prior art systems resulting in the customer service terminal 124.

The use of the system 120 benefits both merchants and customers. Merchants may be able to improve targeted campaigns to drive customer purchase behavior and loyalty. The ability to retain funds until an actual clearing or settlement transaction may reduce the merchant's accounting overhead while potentially allowing more intricate qualification rules. Further, the merchant may no longer need to pay a separate pre-paid card issuer 116 for accepting and managing the award credit value used in the prior art process. This may not only improve cash flow but may also reduce escheatment issues associated with unused funds. Fraudulent awards may be reduced when perpetrators are faced with enrolling value with either their own card, allowing them to be tracked, or another person's card such that the value may not be accessible.

Customers may benefit by eliminating the need to remember to carry and use separate stored value cards. The customer also may have reduced concerns associated with lost or stolen stored value cards because the value is associated with his or her open loop card account not the card itself, so that even the loss of the open loop card may not result in loss of the award value.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A computer-implemented method of using a monitoring infrastructure for identifying qualifying events associated with a merchant award, the method comprising:

generating, at a merchant server of a merchant, a transaction corresponding to a user presenting a payment instrument with a personal account number (PAN);

receiving, by a monitor computer that is part of an acquirer processor and distinct from the merchant server, the transaction from the merchant server;

identifying, by the monitor computer, the transaction as a transaction that meets first criteria for a qualifying transaction;

responsive to identifying the transaction meeting the first criteria, causing, by the monitor computer, the merchant award having a first value associated with the merchant award to be stored in a user record indexed by the PAN at a database of the acquirer processor without transferring the merchant award to any user, issuer, settlement entity, or clearing service;

receiving, by the monitor computer, second criteria from the merchant for the user to redeem the merchant award;

generating, at the merchant server, a second transaction corresponding to the user presenting the payment instrument;

receiving, by the monitor computer, the second transaction from the merchant server;

identifying, by the monitor computer and using the user record indexed by the PAN at the database of the acquirer processor, the second transaction associated with the PAN and that satisfies the second criteria, wherein the second transaction occurs subsequent to the first transaction, and the second criteria comprises a requirement that the PAN corresponding to the second transaction matches the PAN indexing the user record at the database of the acquirer processor;

in response to identifying that the second transaction satisfies the second criteria:
calculating, by the monitor computer, a credit amount that is less than or equal to the first value to be applied to the second transaction; and
sending, by the monitor computer, a second message that, when received by the merchant server, causes the credit amount to be applied to the second transaction; and
generating, by the monitor computer, a credit message transferring at least a remainder of the first value less the credit amount directly from the merchant to a clearing service distinct from the merchant server and the monitor computer.

2. The method of claim 1, further comprising:
sending a first notification message to a user device associated with the PAN responsive to causing the merchant award to be stored in the user record.

3. The method of claim 2, further comprising:
sending a second notification message to the user device associated with the PAN responsive to sending the second message.

4. The method of claim 1, wherein receiving the transaction comprises receiving, at the monitor computer, all transaction requests made by the merchant server.

5. The method of claim 1, wherein identifying the transaction comprises comparing a feature of a transaction request to a previously defined offer, the offer defined by one or more qualifying features of one or more transactions required to qualify for the merchant award.

6. The method of claim 5, wherein a qualifying feature of the one or more qualifying features is a transaction value of the transaction data exceeding a predetermined qualifying value.

7. The method of claim 6, wherein another qualifying feature of the one or more qualifying features is a transaction date falling within a qualifying date range.

8. The method of claim 1, further comprising receiving, at the merchant server, a registration of the PAN for use with the merchant award from the user associated with the PAN.

9. The method of claim 1, wherein identifying the second transaction comprises receiving every transaction generated by the merchant server for use in identifying the second transaction.

10. The method of claim 1, wherein identifying the second transaction that satisfies the second criteria comprises identifying the second transaction as satisfying a time rule defining a date range for use of the merchant award.

11. The method of claim 1, wherein identifying the second transaction that satisfies the second criteria comprises identifying the second transaction as satisfying a brand rule defining one or more merchants with which the second transaction must be performed.

12. A monitor computer that identifies and manages merchant awards, the monitor computer being part of an acquirer processor and comprising:
a central processing unit (CPU);
a memory coupled to the CPU;
an input coupled to the CPU and further coupled to a merchant server that is distinct from the monitor computer;
the CPU programmed with instructions stored in the memory to:
receive first data from the merchant server corresponding to a transaction between a user presenting an open loop card having a personal account number (PAN) and a merchant, the first data including transaction details and an identity of the merchant and the user;
select individual component elements from the first data set to generate a query string for a database;
compare, using the query string at the database, the transaction to an offer sponsored by the merchant and having first criteria;
responsive to identifying that the transaction meets the first criteria, causing a merchant award having a first value associated with the merchant award to be stored in a user record indexed by the PAN of the open loop card of the user at a database of the acquirer processor without transferring the merchant award to any user, issuer, settlement entity, or clearing service;

receive from the merchant server, second data corresponding to a second transaction subsequent to the first transaction, the second transaction corresponding to the user presenting the open loop card having the PAN;

determine using the user record indexed by the PAN at the database of the acquirer processor that the second transaction meets the second criteria, wherein the second criteria comprises a requirement that the PAN corresponding to the second transaction matches the PAN indexing user record at the database of the acquirer processor; and responsive to determining that the second transaction satisfies the second criteria:

calculate a credit amount to apply to the second transaction, wherein the credit amount is less than or equal to the first value and less than or equal to a value of the second transaction, generate a message that, when received by the merchant server, causes the credit amount to be moved from the merchant to the open loop card, and generate a credit message transferring a remainder of the first value less the credit amount directly from the merchant to a clearing service distinct from the merchant server and the monitor computer.

13. The monitor computer of claim 12, wherein the merchant funds the credit amount to be moved from the merchant to the open loop card from a merchant account holding the first value.

14. The monitor computer of claim 12, wherein the credit message is sent to an issuer of the open loop card.

15. The monitor computer of claim 12, wherein the message is generated in real time to reduce an amount of the second transaction by the value of the credit amount at a point of sale.

16. The monitor computer of claim 12, wherein the CPU is further programmed to receive a registration message that enrolls the PAN of the open loop card with the merchant prior to receipt of the first data from the merchant.

17. A computer-implemented method of identifying qualifying events associated with a merchant award, the method comprising:

creating, by a merchant, a first criteria for a user to receive the merchant award;

receiving, by a monitor computer that is part of an acquirer process, the first criteria;

creating, by the merchant, a second criteria for the user to redeem the merchant award;

receiving, by the monitor computer, the second criteria;

registering, by the user, a personal account number (PAN) of an open loop card;

receiving, by the monitor computer from a merchant server that is distinct from the monitor computer, a first transaction of the user corresponding to the user presenting the open loop card having the PAN;

identifying, at the monitor computer, that the first transaction of the user meets the first criteria to receive the merchant award;

in response to identifying the first transaction meeting the first criteria, causing, by the monitor computer, the merchant award having a first value associated with the merchant award to be stored in a user record indexed by the PAN at a database of the acquirer processor without transferring the merchant award to any user, issuer, settlement entity, or clearing service;

generating by the merchant server, a second transaction corresponding to the user presenting the open loop card;

receiving, by the monitor computer, the second transaction from the merchant server, identifying, by the monitor computer and using the user record indexed by the PAN at the database of the acquirer processor, that the second transaction associated with the PAN satisfies the second criteria, wherein the second transaction occurs subsequent to the first transaction using the PAN, and the second criteria comprises a requirement that the PAN corresponding to the second transaction matches the PAN indexing the user record at the database of the acquirer processor;

in response to identifying that the second transaction satisfies the second criteria:

calculating, by the monitor computer, a credit amount that is less than or equal to the first value and less than or equal to a value of the second transaction;

reducing, by the monitor computer, the first value stored in the user record indexed by the PAN at the database of the acquirer processor by the credit amount; and transferring, by the monitor computer, a credit equal to the credit amount directly from the merchant to the open loop card via a clearing service distinct from the merchant server and the monitor computer.

18. The method of claim 17, wherein transferring the credit comprises one of generating a statement credit or generating a real-time credit at a time of the second transaction.

* * * * *